United States Patent [19]

Miyairi

[11] Patent Number: 4,867,668
[45] Date of Patent: Sep. 19, 1989

[54] MOLD FOR PLASTIC MOLDING
[75] Inventor: Kazuki Miyairi, Sakaki, Japan
[73] Assignee: Nissei Jushi Kogyo Kabushiki Kaisha, Nagano, Japan
[21] Appl. No.: 51,652
[22] Filed: May 20, 1987
[30] Foreign Application Priority Data
  May 20, 1986 [JP] Japan .................................. 61-115951
[51] Int. Cl.$^4$ ............................................. B29C 33/00
[52] U.S. Cl. ................... 425/192 R; 101/394; 425/195; 425/408; 425/411
[58] Field of Search ..................... 425/192 R, 193, 195, 425/289, 408, 412, 411, 182; 249/119, 140, 167, 168, 120; 100/918; 72/478; 164/341, 342; 403/341, 373, 374; 199/48; 101/394

[56] References Cited
U.S. PATENT DOCUMENTS

| | | | |
|---|---|---|---|
| 503,251 | 8/1893 | Osborne | 101/394 |
| 635,952 | 10/1899 | Bass | 249/119 |
| 1,952,019 | 3/1934 | Marcy | 101/394 |
| 2,305,945 | 12/1942 | Williams et al. | 425/808 |
| 2,310,525 | 2/1943 | Heller | 72/478 |
| 2,488,935 | 11/1949 | Rempel | 164/342 |
| 2,816,505 | 12/1957 | Michelson | 101/391 |
| 2,956,321 | 10/1960 | Halward | 164/342 |
| 2,966,847 | 1/1961 | Baker et al. | 101/391 |

FOREIGN PATENT DOCUMENTS

| | | |
|---|---|---|
| 59-2807 | 1/1984 | Japan . |
| 60-245512 | 12/1985 | Japan . |
| 61-27211 | 2/1986 | Japan . |
| 0005944 | of 1887 | United Kingdom ................. 101/394 |

Primary Examiner—Willard Hoag
Attorney, Agent, or Firm—Birch, Stewart, Kolasch & Birch

[57] ABSTRACT

A pair of mold bases are provided, each of which possesses a nest-mold insert hole which is open in one direction perpendicular to the mold-closing direction and capable of receiving a plurality of nest molds.

The plurality of nest molds, with contacting wall faces between adjacent members, are inserted into the insert hole of each mold base from the open side of the insert hole. In order that the nest molds will not slip in the mold-closing direction, a wall-face engagement is applied between the nest molds and the inner wall of the insert hole and between the nest molds themselves. Mutually corresponding nest molds on both the mold bases, except substitute nest molds, form the cavity for molded products.

The nest molds put in the insert hole are fixed by being pushed by a fixing device from the open side of the insert hole.

28 Claims, 13 Drawing Sheets

MOLD FOR PLASTIC MOLDING

BACKGROUND OF THE INVENTION

1. Field of the Invention

Conventionally, for multiple molding using a plurality of nest molds put in one mold base, a plurality of insert holes corresponding to the number of nest molds to be inserted are bored on the mold base, and the nest molds put in the insert holes are fixed by suitable fixing means. The fixation of the nest mold in the insert hole is effected by pressing the nest mold by a clamp piece of a clamping device to bring two faces of the nest mold into contact with two faces of the insert hole as the reference faces.

2. Description of the Background Art

FIG. 18 shows an example of a conventional molding mold of this type.

A movable mold 10, an intermediate mold 11, and a stationary mold 12 are provided. Each of the movable mold 10 and the intermediate mold 11 contains, for example, four inserted and fixed nest molds which, upon mold closure, form molding cavities 13 (only one nest mold being shown in the figure). As seen in the figure, on each mold base a plurality of insert holes are bored, each for each nest mold, corresponding to the number of the nest molds needed. Each nest mold 14 is inserted in its corresponding insert hole 23 and fixed separately by a fixing means such as a clamping device (not shown). On each nest mold 14, a runner hole 15 is provided which serves to introduce resin into the cavity 13. On the stationary mold 12, a hot runner block 17 is provided which serves to keep the resin injected through a nozzle 16 melted and hot. The front end of the hot runner block 17 extends to the middle of the back face of the intermediate mold 11. On a receiver plate 18 fixed on the back face of the intermediate mold 11 for holding the nest mold 14, there are radially engraved a runner groove 19 which connects the front end of the hot runner block 15 to each of the runner holes 17 so as to guide the resin from the hot runner block 17 to the inside of each cavity 13. A runner stripper plate 20 may move to and from the stationary mold 12 within a range of a short stroke relative to the stationary mold base 21. On this runner stripper plate 20, a runner lock pin 22 is provided which projects from the stationary mold base 21 and is provided at its tip with an undercut.

For molding, the mold is first closed, and then melted resin is introduced into the cavity 13 from the nozzle 16 through the hot runner block 17, runner groove 19, and runner hole 15. As the mold is opened after molding, the contact between the intermediate mold 11 and the runner stripper plate 20 is opened, the runner branch is cut off at the molded product at the gate, and the undercut of the runner lock pin 22 holds the runner branch adhering to the side of the runner stripper plate 20. Subsequently, the contact between the movable mold 10 and the intermediate mold 11 is opened, and the molded product is exposed and ejected by a suitable ejector pin (not shown). The runner branch falls when the contact between the runner stripper plate 20 and the stationary mold base 21 is opened.

These conventional molding molds have several problems including the need for a plurality of insert holes 23 which are bored on the mold base according to the number of nest molds. Boring of these insert holes complicates the processing of the mold base and increases the production cost. Also, some device for fixing the nest mold 14 in an insert hole needs to be provided on each insert hole 23, which further complicates the molding mold and makes the replacement of nest mold 14 timeconsuming.

Another problem involves the use of plural insert holes 23 which are required to be formed at regular intervals. These holes cause the size of the mold base to become larger and necessarily enlarge the injection molding machine on which the molding mold is attached.

The runner branch is formed as a long cold runner in accordance with the runner groove 19 radially extending from the front end of the hot runner block and this design results in material waste. Especially when the molded product is small, the ratio of runner branch to product is so large as to make the material waste serious.

A further problem arises when the number of the nest molds to be actually adopted is, for example, 3 which is less than the prescribed number. A substitute nest mold having neither cavity nor runner hole provided is then applied in the empty space of the intermediate mold 11. In this case, the same runner branch is formed in the runner groove 19 extending to the substitute mold, resulting also in material waste.

A conceivable way of decreasing the cold runner in volume to cut down the material waste is to extend the hot runner block to a position close to each nest mold, thereby minimizing the runner branch to be formed.

A material-saving way applicable to the case of using a substitute nest mold is to design the contact face of the substitute nest mold to be close to the resin outlet of the hot runner block, thereby eliminating the formation of the runner branch for the substitute nest mold.

However, it has been found that, when the resin outlet of the hot runner block is closed by the substitute nest mold, the resin in the hot runner block is heated to such a high temperature as to be decomposed or deteriorated, resulting in an unfavorable effect which prevents subsequent molding.

SUMMARY OF THE INVENTION

The present invention has been made to eliminate the above-noted conventional problems.

The object of the present invention is to provide molding molds which employ mold bases of simplified structure and which allow size reduction of the mold device and accordingly of the injection molding machine.

The above object has been achieved according to the present invention by providing on the mold base one large nest-mold accommodation space (nest-mold insert hole) which has an opened side wall in the direction perpendicular to the mold-closing direction and is capable of receiving a plurality of jointed nest molds. A plurality of nest molds are inserted with contacted wall faces into the insert hole from the open side of the insert hole. Then, a fixing means presses the nest molds located on the open side of the insert hole and the nest molds located on the open side of the insert hole to fix them within the insert hole.

To prevent the nest molds from slipping in the direction of mold closing, the nest molds are held by engagement of groove and projecting line between wall faces of the nest molds themselves and between wall faces of nest molds and the inner wall of the insert hole.

The fixing means may comprise a fastening piece, in contact with the wall faces of the nest molds located on the open side of the insert hole, and an actuator, such as a cylinder device, capable of pushing the fastening piece against the nest molds from outside. By this fixing means, a plurality of nest molds are simultaneously pushed and positioned firmly relative to the innermost wall of the insert hole as the reference face.

Various fixing means other than the above described one may be employed. For example, an effective fixing means may be obtained by putting a detachable support piece between both the ends of the open insert-hole side of the mold base and setting a pressing means such as a piston-equipped fluid-pressure actuator between the support piece and the nest molds.

In addition, the fixing means may comprise an auxiliary pressing means capable of pushing the nest molds against another wall face of the insert hole perpendicular to the innermost wall of the insert hole. In this case, the nest molds are positioned and fixed with two faces, i.e., the innermost wall and another wall face of the insert hole as the reference faces.

The nest molds preferably have corner cuts. The corner cuts should be longer than the difference between the outer dimension of the largest nest mold and that of the smallest nest mold. The fixing means applicable to this case should comprise pressing pieces capable of separately pushing the nest molds located on the open side of insert hole. With this structure, nest molds, even if different from one another in outer dimensions, may be firmly fixed with wall faces in exact contact with one another and without the corners hitting one another.

As to the nest molds to be used, a plurality of unit-dimension nest molds may of course be employed. Various combinations may also be employed of nest molds each of which is many times as long as the basic dimension in the parting-face side length. In this case, the product ejector devices and resin paths for basic-dimension nest molds may be used selectively. Such a use allows one molding mold to be available for facile molding of various molded products of different sizes.

The molding mold of the present invention is applicable to not only the two-plate system but also the three-plate system additionally using the runner stripper plate. In the three-plate system, the runner stripper plate is made to move a prescribed distance from the stationary mold base in order to disconnect the runner branch adhering to the undercut of the runner lock pin and to let it fall. In the present invention, it is preferable to provide a plurality of runner lock pins around the nozzle for injecting resin into each nest mold. When nest molds of various sizes are to be replaced for use, selection is made of runner lock pins located close to the gate positions of each nest mold. This selection allows the shortening of the runner branch, thereby preventing resin from being wasted at the runner branch.

In connection with the number of nest molds to be set in the mold base, the location in the mold base, having been decided to be out of use, is to be occupied by a substitute nest mold having no cavity. Since the substitute nest mold forms no molded products, its resin path might be closed completely. However, when a hot runner is used as the resin path, a resin in the closed resin path is to be heated to such a high temperature as to cause decomposition or deterioration. In the present invention, when a hot runner block is to be used, a dent leading to the resin path is formed on the back face of substitute nest mold and allowed to form a small dummy runner branch, thereby preventing resin from staying so long as to be decomposed or deteriorated.

As has been described, according to the present invention, the nest molds to be set in the mold base are held by engagement of groove and projecting line between the nest molds and the mold-base wall faces and between wall faces of the nest molds themselves. Therefore, a plurality of nest molds set in one space will not slip at all in the mold open-close direction, no nest molds will be dislocated into a bridge-like form at mold opening or at product ejection, no deformation of molds will occur to cause wear or precision depression, and no decrease in the service life of nest mold will be caused. Since the nest molds are set with wall faces in contact, the structure of mold base and mold device may be simplified, and accordingly the injection molding machine itself, may be made smaller.

Since the nest molds are set with their wall faces in contact with one another, the applicable fixing means may be a simple means such as a single clamp device designed to push plural nest molds simultaneously.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Preferred embodiments of the present invention will be described in detail by reference to the accompanying drawings.

First, the whole mold assembly will be outlined.

Figure 1:
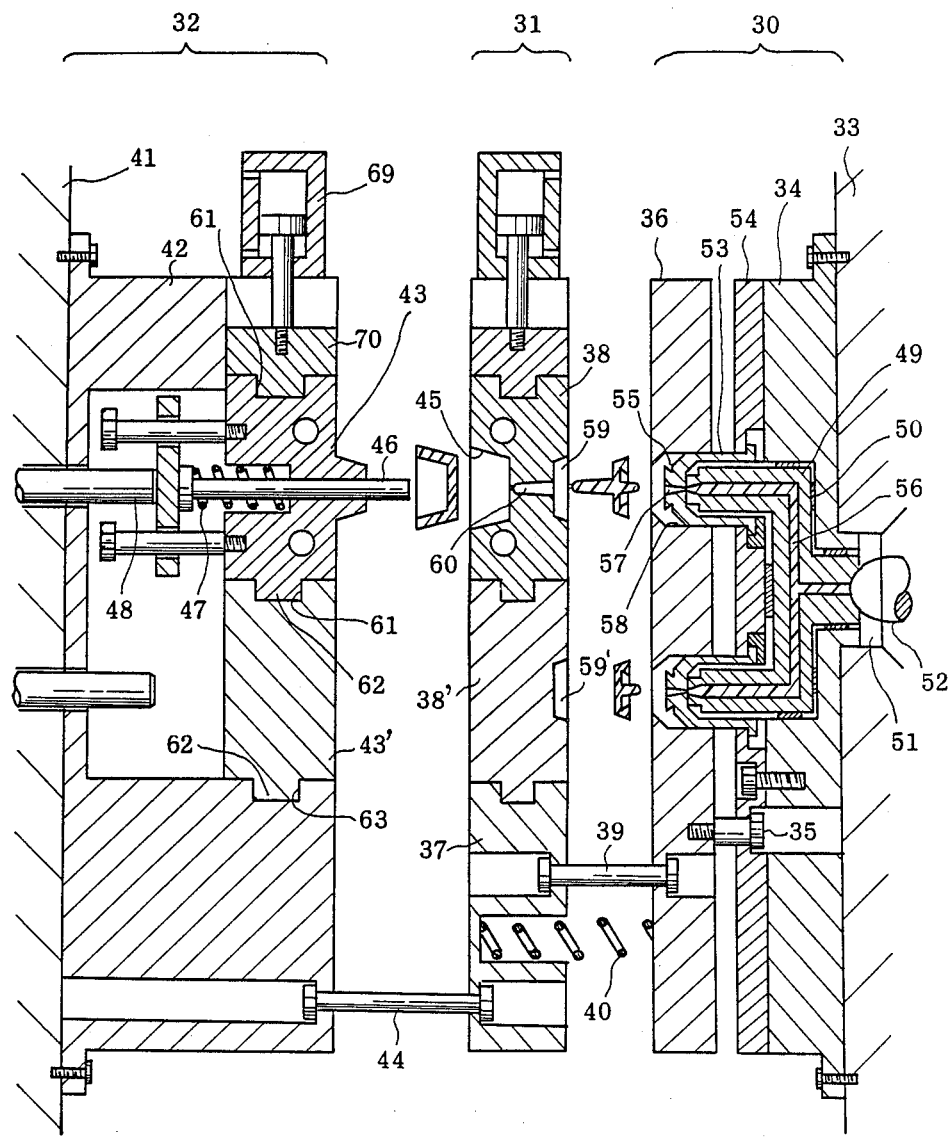
FIG. 1 shows a sectional view of a first embodiment of the present invention with a mold in an open position.

Referring to FIG. 1, a stationary mold 30, an intermediate mold 31, and a movable mold 32 are provided. The stationary mold 30 includes a stationary mold base 34 fixed on a stationary board 33 and a runner stripper plate 36 connected to the stationary mold base 34 by a limiting bolt 35 so as to be movable by a prescribed-stroke distance with respect to the stationary mold base 34.

The intermediate mold 31 has an intermediate mold base 37, with the shape of a bracket which holds four nest molds 38 in its bracket-shaped space by the fixing mechanism described later. The intermediate mold 31 is connected by a limiting bolt 39 to be movable by a prescribed-stroke distance with respect to the runner stripper plate 36. The intermediate mold 31 is energized by a spring 40 in the direction away from the runner stripper plate 36.

The movable mold 32 includes a movable board 41 which is driven by a suitable oil pressure cylinder (not shown) to and from the intermediate mold 31 and stationary mold 30, a movable mold base 42 fixed on this movable board 41, and a movable nest mold 43 which is held in the bracket-shaped space of the movable base 42 by a fixing mechanism described later. This movable mold 32 also is connected to the intermediate mold 31 by a limiting pin 44 so as to be movable by a prescribed-stroke distance from the intermediate mold 31.

A cavity 45 for molding is formed by the set of the nest mold 38 of the intermediate mold 31 and its corresponding movable nest mold 43. Note that, in the example shown, the set of a nest mold 38' and a movable nest mold 43' is shown as a substitute nest mold which forms no cavity.

An ejector pin 46, penetrating the movable nest mold 43, is provided for ejecting molded products and is moved by an ejector rod 48 which is driven against the force of the spring 47.

A hot runner block 49 is provided within the stationary mold 30 by use of heat insulator 50. One end of this hot runner block 49 extends into a nozzle inserting hole 51 provided on the stationary board 33, coming into contact with a nozzle 52. The other end of the hot runner block 49 is branched, each branch end projecting from the stationary mold base 34 toward its corresponding nest mold 38 of the intermediate mold 31.

Figure 2:
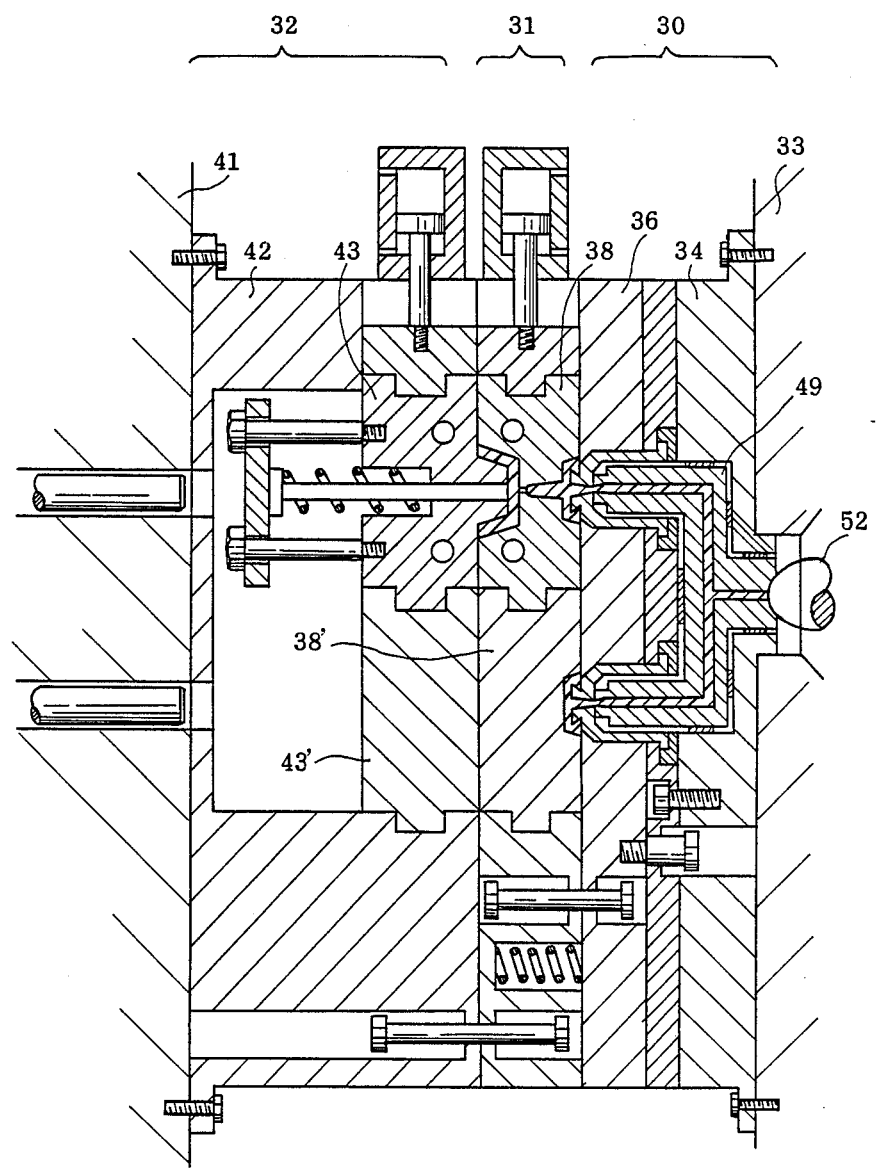
FIG. 2 shows a sectional view similar to FIG. 1 with the mold in a closed position.

A sprue bush 53 is formed in a cap covering each of the above-mentioned branch ends of the hot runner block 49, and is fixed at its base end on the stationary mold base 34 by a fixing plate 54. On the outer circumference of the front end of this sprue bush there is an undercut section 55 for locking the runner branch. At the front end of the sprue bush 53 there is opened a resin path 57 leading to a hot runner 56 which is a resin path of the hot runner block 49. The sprue bush 53 tightly enters a through-hole 58 on the runner stripper plate 36, and when the mold is closed as shown in FIG. 2, the front portion of the sprue bush 53 extends beyond the undercut section 55 and is projected over the surface of the runner stripper plate 36.

On the back face of the nest mold 38 of the intermediate mold 31 there is formed a dent 59, which is sufficiently deep and wide to cover the front end portion of the sprue bush 53 which, as mentioned above, will be projected over the surface of the runner stripper plate 36 at mold closure. A runner 60 is provided which, via a gate, communicates the dent 59 with the cavity 45. The gate position may be selected within the extension of the dent 59 designed to be relatively wide, so that the gate position may be designed with ample freedom when exchange of nest molds 38 is to be made in accord with a variety of molded products. Also on the back face of the substitute nest mold 38' there is formed a dent 59' similar to the abovedescribed dent 59. This dent 59' forms a dummy runner branch at each molding, as shown in the figure.

Next, referring to FIGS. 1~4, a description will be made of the structure and fixing mechanism of the nest mold. For the description only the movable mold is described since the structure and fixing mechanism of the nest mold are the same with both the movable mold 32 and the intermediate mold 31.

Four movable nest molds 43, each square in a front view are set within the bracket-shaped space of the movable mold base 42, in two rows with contacted walls.

A groove 61 is provided at the middle of the upper face of the movable nest mold 43, and a projection 62 at the middle of the lower face. The direction in which the groove 61 and the projection 62 extend are perpendicular to the direction of mold closure.

The movable nest molds 43 vertically adjacent to each other are attached together by use of the groove 61 and the projection 62. The groove 61 on the upper face of the upper-row of movable nest mold 43 catches a prejection provided on the lower face of a clamp 70 on a clamp cylinder 69 to be described later, and the projection 62 on the lower face of the lower-row movable nest mold 43 is caught by a groove 63 provided on the wall face of the movable mold base 42. Thus, the upper- and lower-row movable nest molds 43 are accommodated within the bracket-shaped space of the movable mold base 43, with wall faces in contact with one another.

The movable nest molds 43, held together in engagement by grooves and projecting lines will not slip out in the right-left direction (the mold closing direction) in FIG. 2.

The nest mold 38 of the intermediate mold 31 has a similar structure.

The strength of the movable nest mold 43 as well as the nest mold 38 may be increased if a similar engagement of groove and projecting line is applied to the contact faces between the two upper-row movable nest molds 43 and to those between the two lower-row movable nest molds 43.

Figure 3:
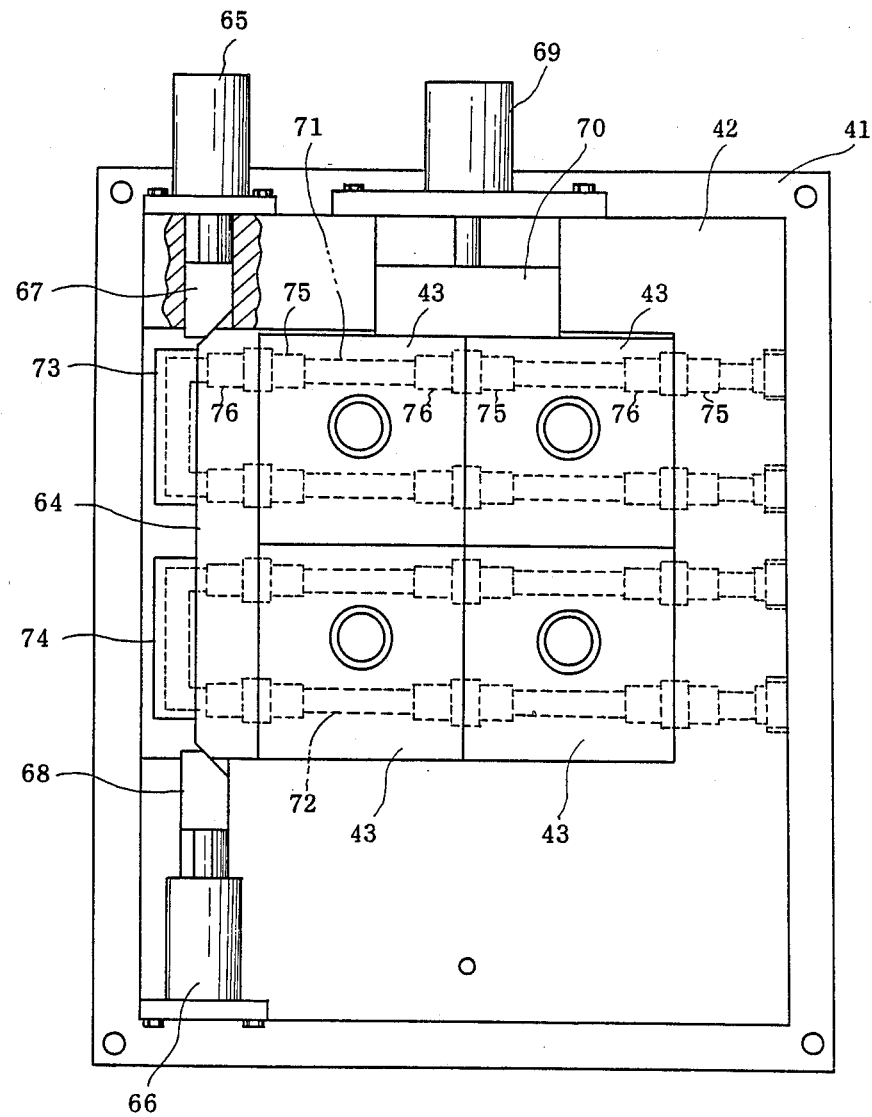
FIG. 3 shows a front view of the first embodiment of the movable mold viewed from the parting plane.
Figure 4:
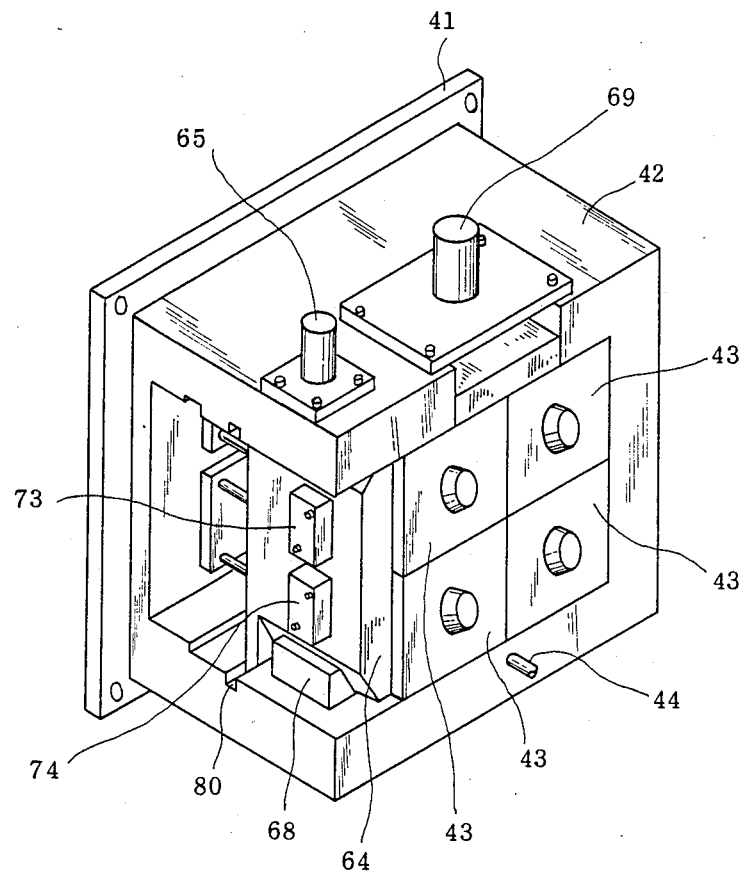
FIG. 4 shows a perspective view of the movable mold of the first embodiment.

Referring to FIG. 3, a fastening piece 64 is guided slidably along a guide groove 80 (FIG. 4) into the bracket-shaped space of the movable mold base 42 in the direction of fastening the movable nest mold 43.

Clamp cylinders 65 and 66 are provided at both the ends of the bracket-shaped movable mold base 42 so as to project their rods into the bracket-shaped space. The clamps 67 and 68 are provided at the ends thereof with sloped edges. These edges are in contact with the sloped edges provided on the fastening piece 64. With such a configuration, the clamp cylinders 65 and 66, when driven, will push the fastening piece 64, resulting in simultaneous fastening of the two-row movable nest molds 43.

One other clamp cylinder 69 is capable of positioning the movable nest mold 43 by allowing its clamp 70 to press the upper face of the upper-row movable nest mold 43. Note that, the clamp cylinder 69 or clamp 70 need not always be provided.

Cooling water circuits 71 and 72 are provided. The cooling water circuit 71 goes and returns inside the upper-row movable nest molds 43 via the fastening piece 64 and a turn block 73 fixed on the fastening piece 64, with the inlet and outlet apertures thereof opened on the movable mold base 42. In the same manner, the cooling water circuit 72 goes and returns inside the lower-row movable nest molds 43 via the fastening piece 64 and a turn block 74 fixed on the fastening piece 64, with the inlet and outlet apertures thereof opened on the movable mold base 42. Each set of the inlet and outlet apertures is to be connected to a set of a cooling water supply pipe and a cooling water discharge pipe (not shown).

The cooling water circuits 71 and 72 have connectable, disconnectable sets of female coupler 75 and male coupler 76 between the movable nest mold 43 and the movable mold base 42, between the two movable nest molds 43, and between the movable nest mold 43 and the fastening piece 64. Therefore, in setting the movable nest molds 43, the fastening of the movable nest molds 43 is to be made after setting the female and male couplers 75 and 76 at the prescribed positions. This operation will complete the connection of the cooling water circuits 71 and 72 simultaneously with the setting of the movable nest molds 43.

Accordingly, the procedure of incorporating the movable nest molds 43 into the bracket-shaped space of the movable mold base 42 is as follows. The four movable nest molds 43 are brought into engagement with grooves and projecting lines with the wall faces of the movable mold base 42 and with the contact wall faces of themselves, and the female and male couplers 75 and 76 are applied at the above-specified positions. The assembly thus prepared is now inserted from the bracket-shaped open section into the bracket-shaped space. Then, after applying the fastening piece 64 at the bracket-shaped open section, the clamp cylinders 65, 66 and 69 are operated. The clamp cylinders 65 and 66 will push the movable nest molds 43 to the right in FIG. 3, and the clamp cylinder 69 will push them downward. Simultaneously, the connection of the cooling water circuits 71 and 72 is completed.

Note that, the engagement of grooves and projecting lines between the movable nest molds 43 and the movable mold base 42 and between the movable nest molds 43 themselves, may be effected not only by use of the groove and projecting line described above but also by a combination of, for example, a circular indent and a corresponding cylindrical projection.

The setting of the nest mold 38 in the intermediate mold base 37 may be carried out similarly.

Next, the molding operation will be outlined.

After mold closure, resin melt is injected for molding from the nozzle 52 into the cavity 45 via the hot runner 56, resin path 57, indent 59, and runner 60.

An oil pressure cylinder (not shown) is driven to open the movable mold 32. Since the intermediate mold 31 is energized by the spring 40, the contact between the intermediate mold 31 and the runner stripper plate 36 is first opened. The runner branch is held by undercut section 55 of the sprue bush 53, and therefore is separated from the molded product at the gate section to be left on the side of the runner stripper plate 36.

Similarly, the runner branch for the substitute nest mold 38' is left as a dummy runner branch on the side of the runner stripper plate 36.

When the movable mold 32 is further opened, the intermediate mold 31 moves to the limit set by the limiting pin 39, and then is separated from the movable mold 32, with the molded product adhering to the movable mold 32. This molded product is ejected by the ejection pin 46 and will thereafter fall down for subsequent handling. The restriction imposed by the limiting pins 44 and 39 and the limiting bolt 35 will open the contact between the runner stripper plate 36 and the stationary mold base 34, and accordingly the runner branch and the dummy runner branch are pushed by the runner stripper plate 36 and caused to fall down from the front end of the sprue bush 53 to be taken up.

Figure 5:
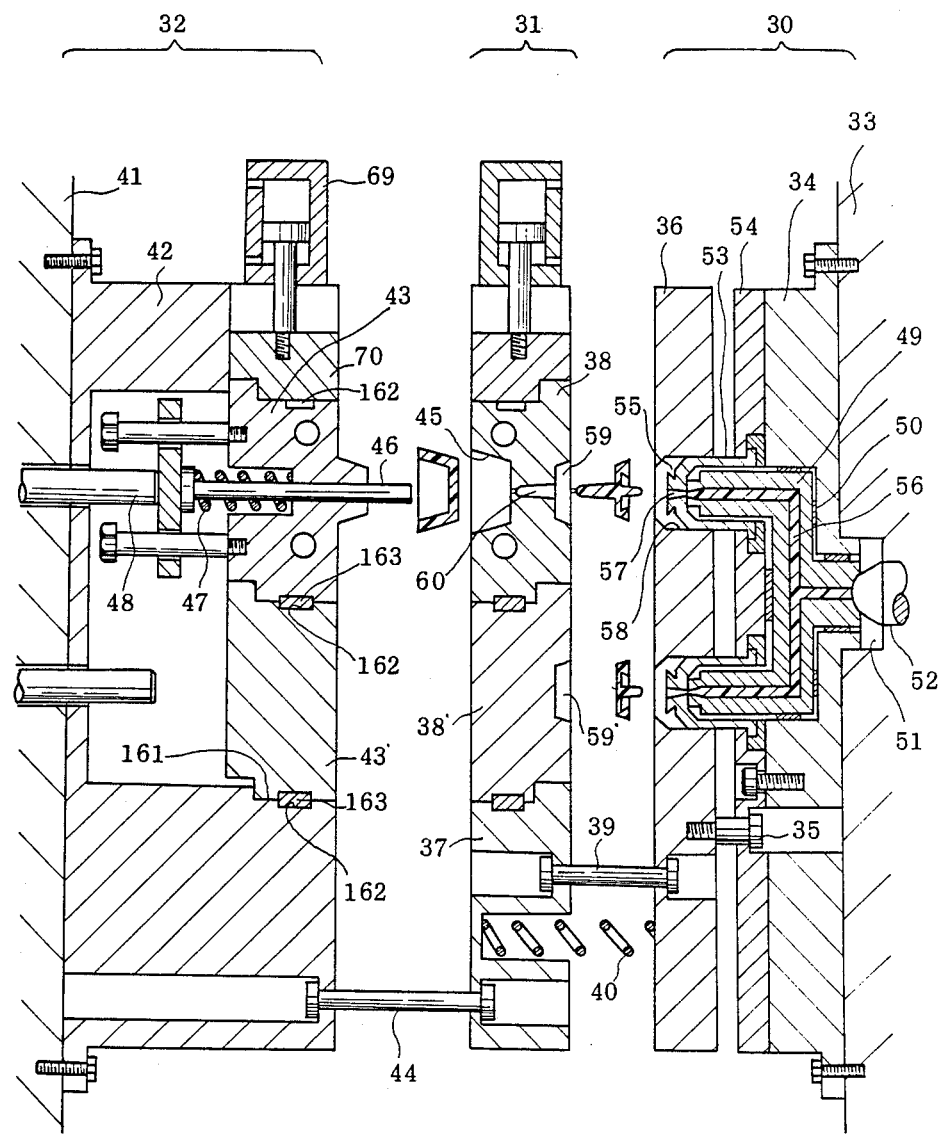
FIG. 5 shows a sectional view similar to FIG. 1 of the mold in an open position but with another embodiment of a connection means between the molding mold.

FIG. 5 shows another embodiment.

The same components as used in the above embodiment will be represented by the same symbols and will not be described again.

The four movable nest molds 43 are square in front outer shape and are set in the bracket-shaped space of the movable mold base 42, in two rows with their walls in contact with one another.

The upper and lower faces of the movable nest molds 43 have stepped planes, and the movable nest molds 43 vertically adjacent to each other are in engagement of groove and projecting line by the stepped planes. The projection on the upper face of the upper-row movable nest mold 43 is in sliding contact with the groove on the wall face of the movable mold base 42, and the projection on the lower face of the lower-row movable nest molds 43 is caught by the stepped section 161 on the wall face of the movable mold base 42 (FIG. 5). On the upper and lower faces of the movable nest molds 43 and the wall-face stepped sections 161 of the movable mold base 42 there are formed key ways 162 at positions corresponding to one another, and the engagement of the key way 162 with a key 163 further effectively prevents mutual slippage between the movable nest molds 43. One end of the key 163 is held on the wall face of the movable mold base 42, and the other end is caught by the hole provided on the fastening piece 64 (not shown in FIG. 5).

FIGS. 6~9 show another embodiment.

Figure 6:
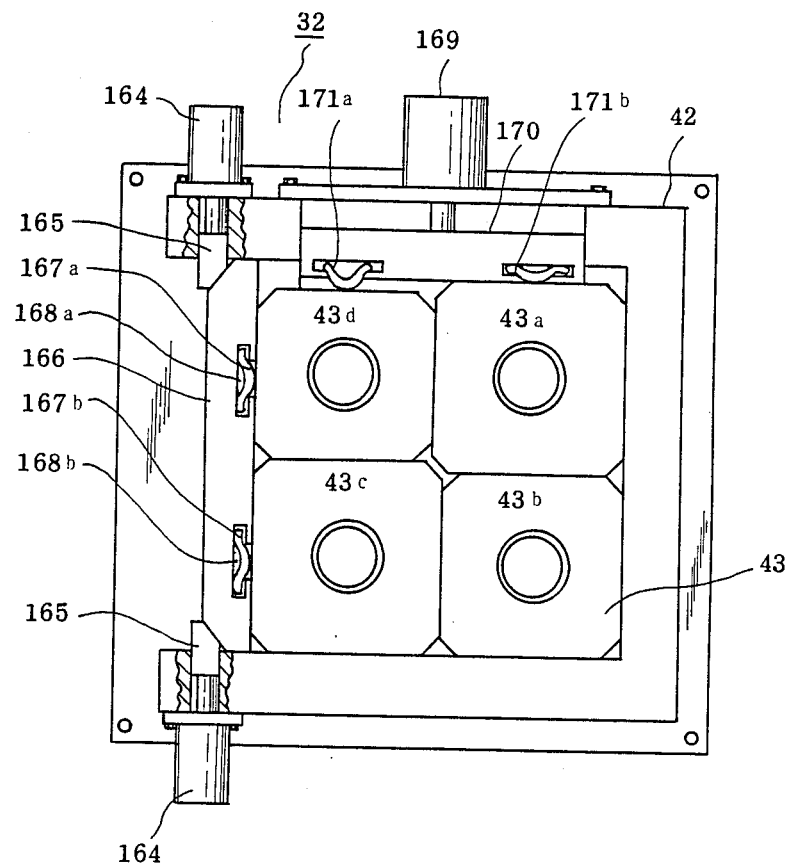
FIG. 6 shows a front view of a second embodiment of the present invention of the movable mold viewed from the parting plane.

FIG. 6 shows the movable mold 32 viewed from the parting plane.

The four movable nest molds 43 are rectangular in front outer shape with corner cuts, and are set in the bracket-shaped space of the movable mold base 42 in two rows with their sidewall faces in contact with one another.

The dimensions of the corner cut of each movable nest mold 43 are such that, with the four movable nest molds 43a, 43b, 43c and 43d in contact with the reference faces, i.e., the inmost wall and inner lower face, as shown in the figure, no corner sections of the nest molds will hit one another even if there are any dimensional differences among the movable nest molds 43, or that the size of the corner cut is more than the dimensional difference between the largest and the smallest nest mold.

Figure 7:
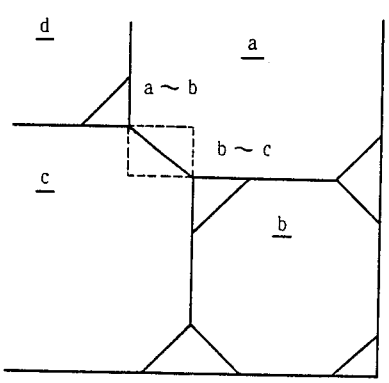
FIG. 7 illustrates the dimensional condition for the corner cut to be provided on the nest mold of the second embodiment.

The necessity of the adoption of the above dimensional correlation may be understood from FIG. 7, which shows in regard to the nest molds "a", "b" and "c" that the nest molds "a" and "c" should have corner cuts of "a∼b" and "b∼c" in length, respectively, in order that the corner sections of the nest molds "a" and "c" do not hit each other.

Therefore, when each movable nest mold 43 has had a corner cut applied as specified above, the movable nest molds 43 are secured to have their side-wall faces in contact with one another.

Plate springs 167a and 167b respectively project from T-slots 168a and 168b, provided at the positions on the fastening piece 166 corresponding to the wall faces of the vertically adjacent movable nest molds 43c and 43d, so as to press the wall faces of the movable nest molds 43c and 43d. This secures the movable nest mold 43 to be pressed so exactly as to prevent lateral slippage, even if the movable nest mold 43 are different from one another in outer dimensions.

A vertical clamp cylinder 169 is provided at the upper part of the bracket-shaped section of the movable mold base 42, and a vertical clamp 170 attached at the lower end of the rod thereof presses the movable nest molds 43. Plate springs 171a and 171b, similar to the above-mentioned plate springs 167a, 167b are provided on the lower face of the vertical clamp 170, pressing the upper faces of the two upper-row movable nest molds 43a and 43b, respectively. This secures the movable nest mold 43 to be pressed so exactly as to prevent vertical slippage, even if the movable nest molds 43 are different from one another in outer dimensions.

As described above, the provision of the corner cuts on the movable nest molds 43 and the plate springs 167a, 167b, 171a and 171b secures each movable nest mold 43 to bring its prescribed wall faces into such an exact contact that the precise positioning and firm fixation will prevent slippage.

The stationary mold 38 may be fixed similarly.

For this embodiment, the vertical clamp cylinder 169 (and therefore the vertical clamp 170 and plate springs 171a and 171b) need not always be provided, and the plate springs 167a, 167b, 171a and 171b may be replaced by elactic material such as rubber or spring, or a fluid pressure actuator.

The number of nest molds is not restricted to 4, but any number of nest molds may be adopted.

Figure 8:
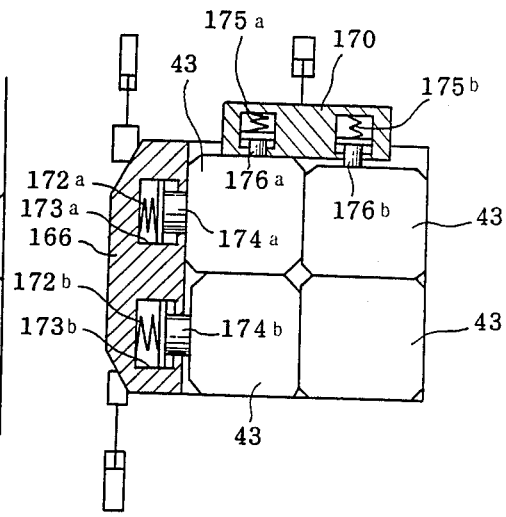
FIG. 8 shows a front view of the wall faces of nest molds with corner cuts which are separately pressed by elastec pieces of the second embodiment.

In the embodiment shown in FIG. 8, the means for pressing the nest mold 43 comprises coil springs 172a and 172b provided, respectively, in holes 173a and 173b on the fastening piece 166. The pressing pieces 174a and 174b, the front ends of which are ejectable to extend outside the holes 173a and 173b, respectively, serve to press the nest molds 43.

The vertical clamp 170 is also provided with similar coil springs 175a and 175b, and pressing pieces 176a and 176b for pressing the nest mold 43.

Figure 9:
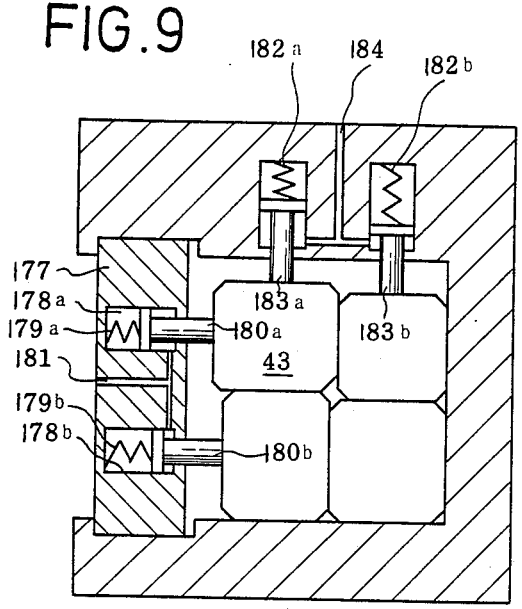
FIG. 9 shows a front view of a support piece and piston-equipped fluid-pressure actuators as a fixing means of the second embodiment.

FIG. 9 shows an embodiment making use of fluid pressure actuators.

In this embodiment, in place of the fastening piece 166, a support piece 177 is applied detachably in the grooves provided on the inner upper and lower faces of the open section in the bracket-shaped space. In the cylinder holes 178a and 178b provided on the inner wall face of the support piece 177 there are, respectively, provided pistons 180a and 180b energized by coil springs 179a and 179b, respectively. The rod ends of the pistons 180a and 180b press the corresponding nest molds 43.

For replacing nest molds 43, fluid is introduced via a flow path 181 into the right chambers of the cylinder holes 178a and 178b to retire the pistons 180a and 180b.

Also, on the inner upper face of the bracket-shaped space there are provided similar coil springs 182a and 182b and pistons 183a and 183b to press the nest mold 43 downward. A flow path 184 is for retiring the piston.

This embodiment employs neither the vertical clamp cylinder 164 nor the lateral clamp cylinder 169, but the use of the pistons 180a, 180b, 183a and 183b for pressing each nest mold 43 separately results in similar functional effects.

In this embodiment, the coil spring may be used for retiring the piston and, correspondingly, the fluid pressure may be used for operating the piston to press and fix the nest mold.

Figure 10:
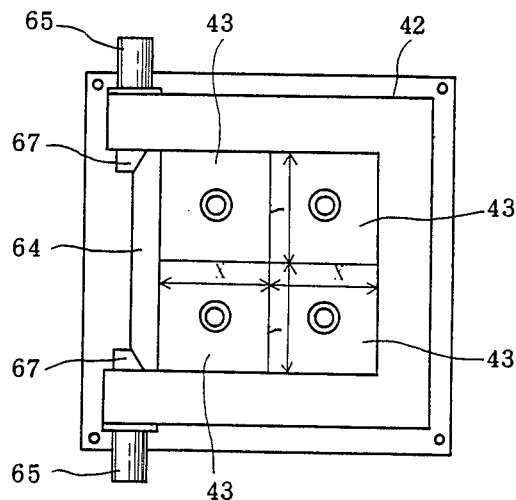
FIG. 10 shows a front view of a third embodiment of the present invention of a molding mold using nest molds of the basic dimensions.

FIGS. 10∼14 refer to another embodiment.

This embodiment is concerned with large molded products which cannot be produced with the nest molds having the basic dimensions, i.e., lateral dimension X and vertical dimension Y. The embodiment is based on replacement of the nest molds of the basic dimensions by those nest molds whose lateral and/or vertical dimensions are many times larger than the basic nest molds.

Figure 11:
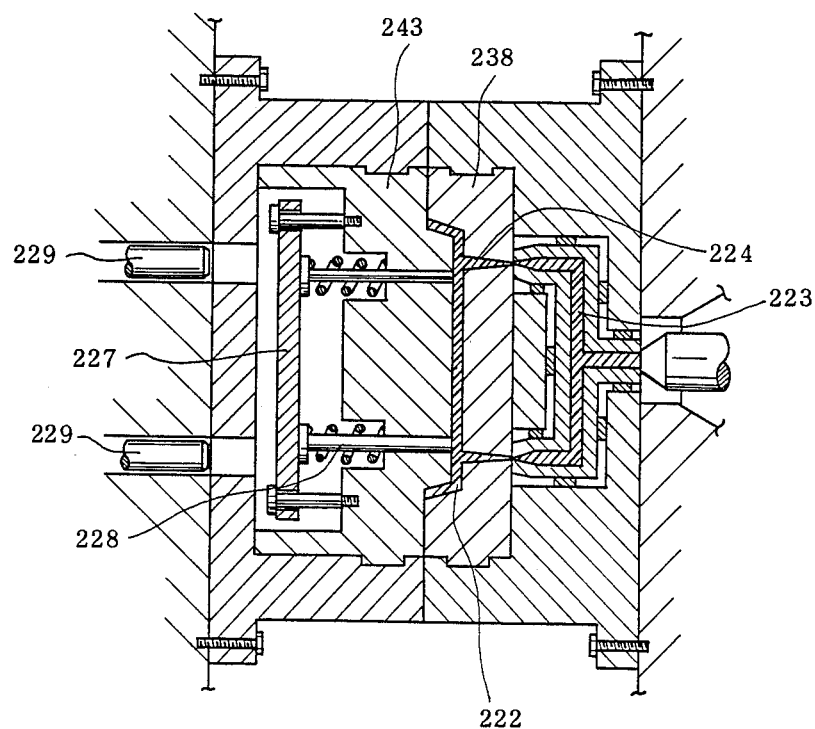
FIG. 11 shows a sectional view of thi third embodiment of a molding mold using nest molds of twice the basic dimensions.
Figure 12:
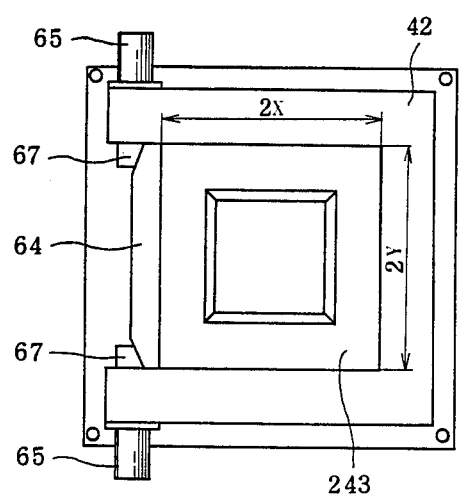
FIG. 12 shows a front view of the third embodiment of a movable mold using nest molds of twice the basic dimensions.

FIGS. 11 and 12 refer to a case where one movable nest mold 243 and one stationary nest mold 238 are inserted, both of which are 2X and 2Y in lateral and vertical dimensions, respectively. For fixing each nest mold within the respective mold base, similar clamp cylinders and fastening pieces as already described may be employed.

The movable nest mold 243 has the same thickness as the movable nest mold 43 and is equipped with an ejector plate 227 wide enough to hadle four ejector rods 229. Ejector pins 228 are provided in a suitable number matching the size of the molded product. The four ejector rods 229 may each be used selectively.

The stationary nest mold 238 has the same thickness as the stationary nest mold 38 and is equipped with a resin path 224 connecting the apertures of a hot runner 223 to the cavity. This resin path 224 does not always need to be connected to all the apertures can be of the hot runner 223 but some apertures closed in accordance with the shape, etc. of the molded products.

The use of the double-sized movable and stationary nest molds 243 and 238 allows an area of the parting face to be used which is four times as large as the basic-sized nest mold and accordingly to employ such large cavities as are unavailable with the basic-sized nest mold. Thus, it has now been made possible to produce large molded products. Note that, the mold shown in FIG. 11 is on the two-plate system which uses no runner stripper plate.

Figure 13:
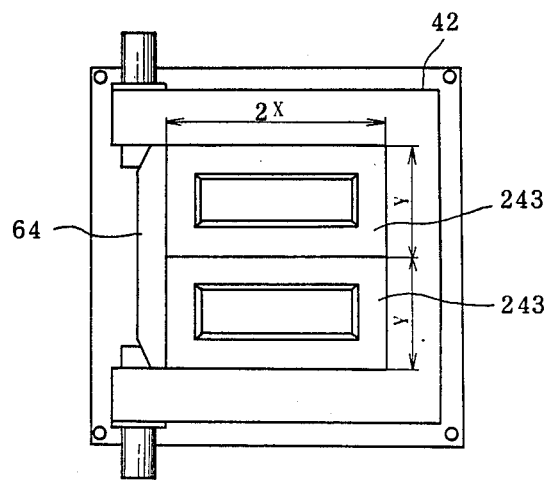
FIG. 13 shows a front view of the third embodiment of a movable mold using nest molds of twice the basic lateral dimension.

FIG. 13 refers to a case where two nest molds both 2X and Y in the lateral and vertical dimensions, respectively, are set in the mold base.

Figure 14:
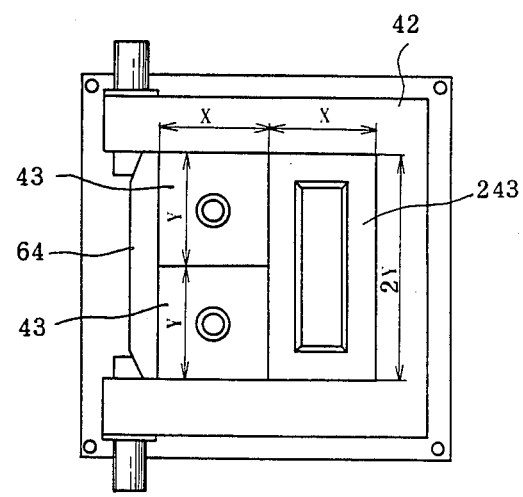
FIG. 14 shows a front view of the third embodiment of a movable mold using two nest molds of the basic dimensions and two nest molds of twice the basic vertical dimension.

FIG. 14 refers to a case where the mold base is loaded with one nest mold X and 2Y in the lateral and vertical dimensions, respectively, and two nest molds of the standard dimensions.

The mold bases used in the previous embodiments are of the size capable of accommodation of four nest molds of the basic dimensions, but this embodiment may employ such mold bases as are capable of receiving more than two nest molds of the basic dimensions.

As seen from the above description, according to this embodiment, full use of the advantages of the nest mold system can be obtained. Especially, suitable molds for producing a variety of products in small amounts can be used. That is, only one molding mold may be used to easily obtain several molded products of different sizes.

Figure 15:
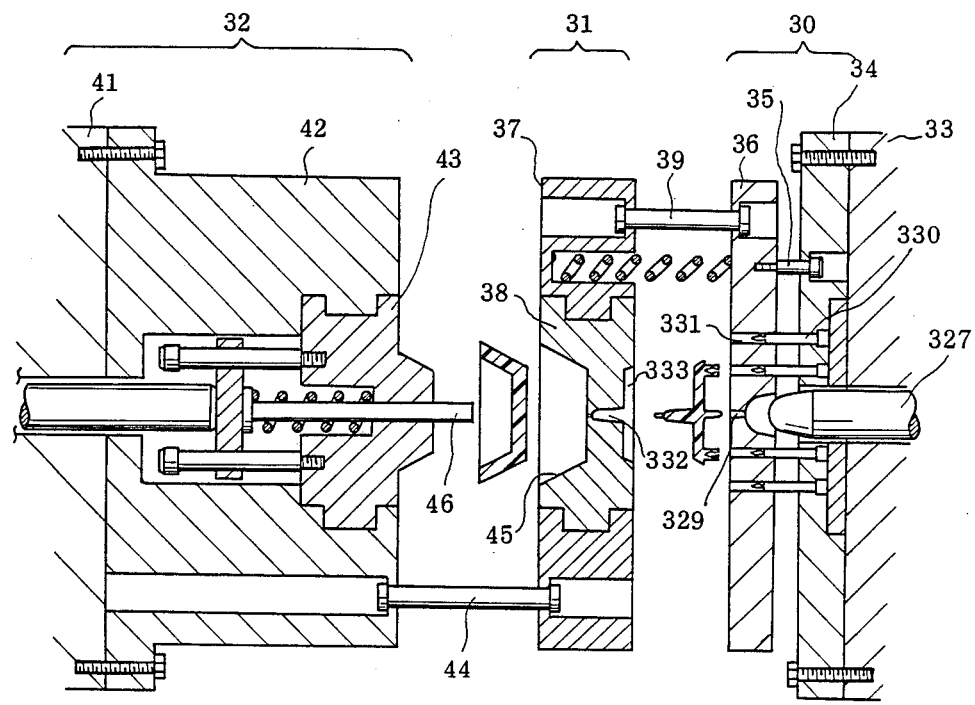
FIG. 15 shows a sectional view of a fourth embodiment of the present invention of a molding mold in an open position.
Figure 16:
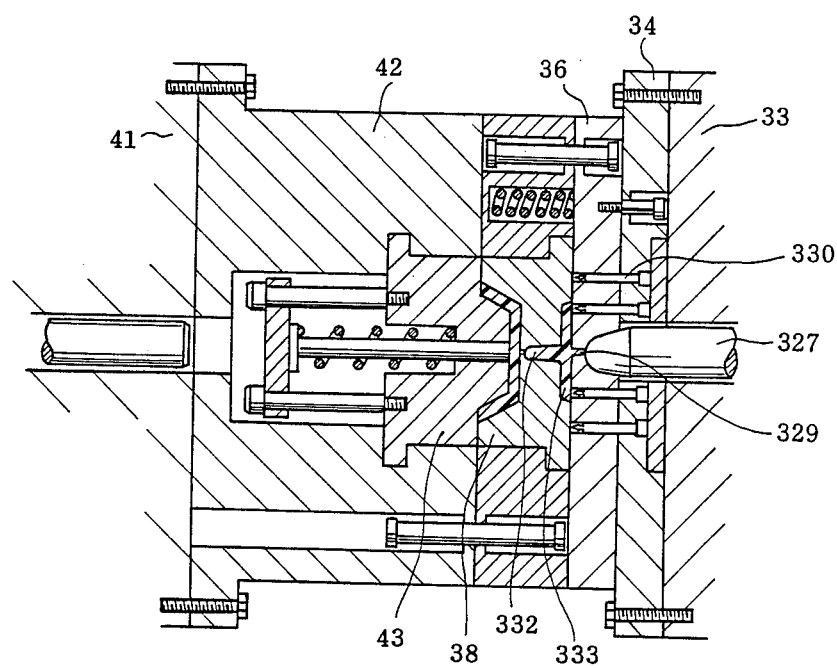
FIG. 16 shows a sectional view of the fourth embodiment of a molding mold in a closed position.
Figure 17:
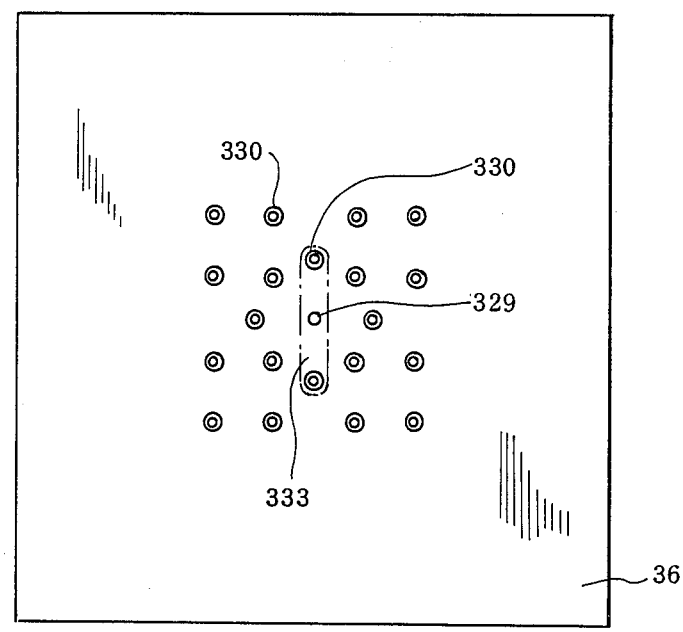
FIG. 17 illustrates the arrangement of runner lock pins for the fourth embodiment.
Figure 18:
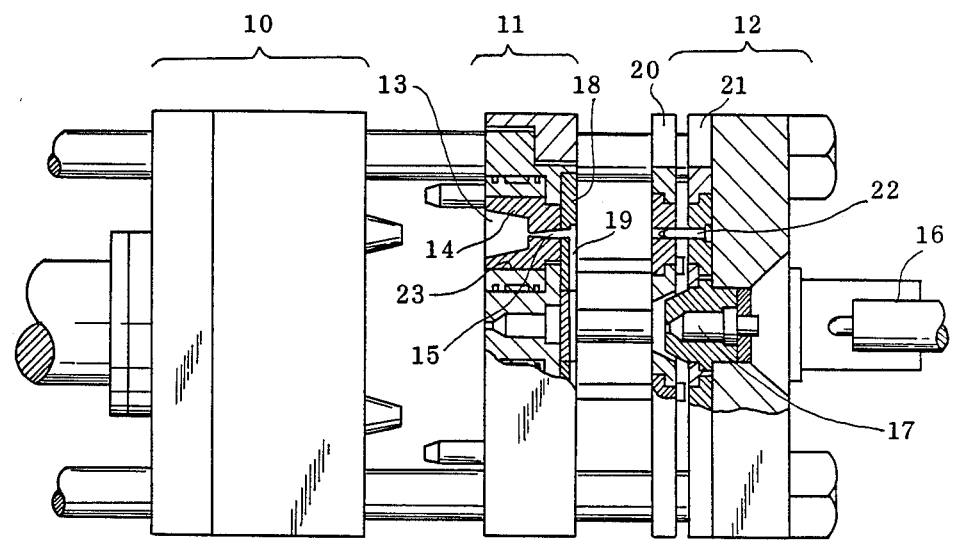
FIG. 18 shows a partially exploded sectional view of a conventional molding mold.

FIGS. 15~17 refer to a fourth embodiment. The same parts as shown in FIG. 1 will be represented by the same symbols and will not be described again. Note that, in these figures only one pair of nest molds 43 and 38 is used for simplifying the description. Also in this embodiment the bracket-shaped space of the mold base is made to accommodate a plurality of pairs of nest molds.

Referring to FIG. 15, a nozzle 327, i.e., the branch end of the hot runner block, reaches a runner stripper plate 36 through a nozzle advance hole provided on both a stationary board 33 and a stationary mold base 34. A sprue hole 329 is provided on the runner stripper plate 36.

On the stationary mold base 34, as shown in FIG. 17, there are twenty runner lock pins 330, with undercuts at their front ends, provided vertically at suitable intervals around the nozzle advance hole. The runner lock pin 330 may slide back and forth in a through-hole 331 bored on the runner stripper plate. The length of the runner lock pin 330 is such that its front end will not project over the face of the runner stripper plate 36 when the mold is closed (FIG. 16).

On the back face of the stationary nest mold 38 there is provided a runner hole 332 connecting a sprue hole 329 to a cavity 45. A runner channel 333 is engraved connecting the runner hole 332 to two runner lock pins 330 located near the runner hole 332.

Runner lock pins to be used are suitably selected on the basis of the gate positions on the stationary nest mold 38. Usually, one or two runner lock pins 330 closest to the gate position are used. Thus, we have only to prepare a stationary nest mold 38 having a runner channel 333 engraved extending from the runner hole 332 toward a prescribed runner lock pin 330.

The above description has used a nest mold of the direct-gate type. Any nest gates of the side-gate type may be employed similarly. With the side-gate type, the runner hole is to be bored from the back face of the stationary nest mold, a runner channel is engraved connecting the runner hole to the sprue hole, and the runner channel is to be extended to suitable runner lock pins near the runner hole.

A plurality of runner lock pins 330 are provided, so that the runner channel 333 has only to be extended to a nearby runner lock pin 330 according to the gate positions on the stationary nest mold 38. Thus, for the same mold base various nest molds with different gate positions may be used interchangeably. Since optimun runner lock pins 330 may be selected according to the gate position, neither disturbance of gate separation nor prevention of runner separation will be caused. The freedom in mold designing is increased, e.g., various molded products may be obtained by interchange of nest molds for the same mold base, so that we may have a number of advantages such as reduction in molding cost, mold cost, or mold management cost.

Below will be described a preferred method of setting molding conditions which is applicable to multi-product molding by using a plurality of nest molds as in the embodiment having been described.

In general, the molding conditions of the injection molding are divided into so many items: injection speed, injection volume, injection pressure, injection duration, melting point of resin, and so on. In addition, each phenomenon results from simultaneous working of a number of factors, for example, flow mark, a defect in injection molding, injection speed, melting point of resin, etc. Therefore, if the molding conditions are set on the basis of the experience or sixth sense of operators, many problems arise that a high level of knowledge and much time are required, and that significant losses are involved in the rising time after mold setting and in materials and energies wasted during the adjustment of molding conditions. In the case of the multi-product molding using nest molds, it is inefficient to adjust and set molding conditions every time the number of products is changed, in view of the component molds being the same.

Thus, description will be made of the method of setting molding conditions which is easily applicable and is capable of contribution to simplification.

In the present embodiment, first the molding conditions for single-product molding which is relatively easy to set are established, as has been made practically, through operators' experience and sixth sense, and then these molding conditions are saved in the memory device.

When some nest molds have been added to increase the number of products planned, those conditions whose values change in proportion to the number of products are calculated from their values for single-product molding in accord with their characteristics that their values increase in proportion to the number of products, and their values thus obtained are taken to be the values for setting. Practical molding is conducted on the bases of these set values and only final adjustment is performed manually if needed.

For example, the method of setting molding conditions will be described with respect to the volume-measurement stop position for determining injection volume taken as the item to be set.

First, the single-product molding condition is to be arranged by using one set of nest molds effective for production and a suitable number of substitute nest molds ineffective for production, and the molding conditions are to be found by trial and error as usual. Thus, the volume-measurement stop position will be determined which corresponds to the prescribed product volume (for convenience of explanation, the no-dead-space molding is considered, i.e., the cushion amount is taken to be zero). The adjustment of this set value may be carried out relatively easily since the condition for single production is concerned.

The value of the molding condition thus set is saved in a memory device (not shown).

Next, for example, in the case when one substitute nest mold has been replaced by one nest mold for two-product molding, the number of products (two) is set on the product number setting device (not shown). This setting will order a controller (not shown) equipped with a microcomputer to carry out a calculation for doubling the volume-measurement stop position saved in the memory device, the result of calculation being output on a display device (not shown).

In the present embodiment, the value thus calculated is assumed to be the volume-measurement stop position for the two-product molding. The injection volume will be doubled by changing the conditions of the injection molding machine on the basis of the set value.

The injection volume thus set is almost equal to the cavity capacity for the two-product molding, so that the manual setting of the volume-measurement stop position is as much as fine adjustment.

Similarly, injection speed, injection pressure, etc. which are in proportionality ralation with the product number may be set by proportional calculation on the value set for single production.

The molding condition items (heating cylinder temperature, screw revolution number, etc.) which are almost insusceptible to the number of products may be set by calling their values set for single production from the memory device and using them as they are.

Similarly, when three or more nest molds having the same cavities in shape are to be used on a mold base, the applicable molding conditions may be set on the basis of the values for single production.

Since, according to this embodiment, the values for molding condition setting for varying numbers of products are set by computations based on the values set for single production, the manual, initial setting of the condition items may be omitted. The operator has only to perform final adjustment, which results in simplification of condition setting. Furthermore, the time required for the adjustment may be shortened, and accordingly, the material and energy losses inherent in condition setting may be reduced so as to promote productivity.

The present invention has been described in detail by reference to preferred embodiments. However, of course, it is not to be restricted to the embodiments described but a number of modifications may be made within the scope not deviating from the spirit of the invention and all modifications as would be obvious to one skilled in the art are intended to be included within the scope of the following claims.

What we claim is:

1. A mold for plastic molding comprising:
   a plurality of nest molds;
   a pair of mold bases, each of which has a generally rectangular nest-mold insert hole and having an opening in one side wall, said opening being such as to permit a plurality of nest molds to be placed in said insert hole in a direction perpendicular to a mold closing direction, said mold bases having wall faces and other side walls opposite the side wall having an opening, said wall faces and other side walls aiding in positioning of said plurality of nest molds;
   said plurality of nest molds having adjacent wall faces in contact when inserted into said insert hole from the opening in said bases, at least some of said nest molds being engaged with an inner wall of said insert hole and with wall faces of adjacent nest molds to avoid slippage in the mold closing direction, and said nest molds generally forming cavities for molding the molded products upon mold closure;
   fixing means including actuator means for pressing said nest molds placed on said open side of said insert hole in the direction from said open side of said bases toward the innermost wall of said inert hole; and
   a conduit for resin, said conduit being formed in each of said plurality of nest molds of one of said bases and being connected to said cavities.

2. The mold according to claim 1, wherein one of said mold bases is fixed on a stationary board and the other is fixed on a movable board capable of moving to and from said stationary board.

3. The mold according to claim 1, wherein, between the inner wall of said insert hole and said nest molds and between said adjacent nest molds, engraved key ways extending perpendicularly to the direction of mold opening and closing are provided, and wherein said key ways have key pieces inserted therein through holes provided on the other side wall of said mold bases and said fixing means.

4. The mold according to claim 1, wherein on one wall face of said nest mold a projection is formed which extends perpendicularly to the direction of mold closing, and on the wall face opposite to said wall face with said projection formed therein, a groove is provided in correspondence with said projection, and on one inner wall of said insert hole, a groove is provided in correspondence with said projection of said nest mold, and on the other inner wall of said insert hole, a projection capable of entering the groove of said nest mold is provided, and said projections and grooves enable engagement of grooves and projections between nest molds themselves and between nest molds and the inner wall of said insert hole.

5. The mold according to claim 1, wherein said fixing means comprises a support piece, which is detachably bridged between both the ends of said opening of said mold base, and pressing means, which is provided between said support piece and the wall face of nest molds facing said support piece for pressing said nest molds against the innermost wall face of said insert hole.

6. The mold according to claim 5, wherein said pressing means comprises fluid pressure cylinders equipped with pistons coming into contact with wall faces of corresponding insert molds thereof.

7. The mold according to claim 1, wherein said fixing means further comprises an auxiliary pressing means for pressing said nest molds against wall faces of said insert hole perpendicular to the innermost wall of said insert hole.

8. The mold according to claim 7, wherein said auxiliary pressing means comprises clamps in contact with said wall faces of nest molds and cylinder devices to energize said clamps.

9. The mold according to claim 1, wherein:
   said nest molds inserted in said insert hole have corner cuts which are longer than the difference between the outer dimension of the largest nest mold and the outer dimension of the smallest nest mold; and
   said fixing means comprises a support piece, which is bridged attachably and detachably between both the ends of said open section of said mold base, and a pressing means which is provided between said support piece and the corresponding wall faces of nest mold thereof and which pushes each corresponding nest molds separately against the innermost wall of said inser hole.

10. The mold according to claim 9, wherein said pressing means comprises a fluid pressure cylinder device which is equipped with pistons in contact with corresponding wall faces of nest molds.

11. The mold according to claim 1, wherein said fixing means further comprises a fastening piece which extends from the open side of said insert hole into contact with the wall faces of said nest molds located on said open side and said actuator means urges said fastening piece toward the innermost section of said insert hole.

12. The mold according to claim 11, wherein said actuator means comprises a cylinder device.

13. The mold according to claim 11, wherein said fastening piece has at least tapered ends at both ends thereof opposite to the contact face with said nest molds, and said actuator means is equipped with cylinder devices provided near each side of said opening, said cylinder devices having clamps which are provided at ends of said cylinder device, said clamps each having a pressing section which contacts one of said tapered ends of said fastening piece.

14. The mold according to claim 1, wherein:
said nest molds inserted in said insert hole have corner cuts which are longer than the difference between an outer dimension of the largest nest mold and an outer dimension of the smallest nest mold; and
said fixing means comprises pressing pieces which push separately the wall faces of said nest molds located on the open side of said insert hole.

15. The mold according to claim 14, wherein:
said fixing means comprises a fastening piece, in contact with said wall faces of said nest molds located on the open side of said insert hole from said open side, and an actuator which presses said fastening piece against the innermost face of said insert hole; and
said pressing pieces comprise elastic pieces which are provided on the inner wall of said fastening piece and which come into elastic contact with the corresponding wall faces of said nest molds.

16. The mold according to claim 15, wherein said elastic pieces comprise plate springs.

17. The mold according to claim 15, wherein said elastic pieces comprise coil springs.

18. The mold according to claim 14, wherein said fixing means further comprises an auxiliary pressing means for pushing said nest molds against wall faces of said insert hole perpendicular to said innermost wall of said insert hole.

19. A mold comprising:
a pair of mold bases, each of which has a nest-mold insert hole having one side in a direction perpendicular to a mold closing direction open and which is capable of receiving a plurality of nest molds of basic dimensions thereof;
an ejector device for ejecting molded products provided on one of said mold bases;
a conduit provided on the other mold base for resin;
nest molds, at least one parting-face side of which is many times as long as a corresponding parting-face side of said nest mold of a basic dimension, so that walls of adjacent said molds are in mutual contact, said ejector device and said resin conduit being selectively usable with said molds, said nest molds after being inserted in the insert holes form cavities connected to said resin conduit upon mold closing; and
fixing means including actuator means for pressing said nest molds placed on said open side of said insert hole in the direction from said open side of said insert hole toward the innermost wall of said insert hole.

20. The mold according to claim 19, wherein on one wall face of said nest mold there is a projection extending perpendicularly to the direction of mold closing, on the wall face opposite to said wall face with said projection thereon is a groove in correspondence with said projection, and on one inner wall of said insert hole there is a groove in correspondence with said projection of said nest mold, and on the other inner wall of said insert hole there is a projection capable of entering said groove of said nest mold, and said projections and grooves enable engagement of grooves and projections between said nest molds themselves and between nest molds and the inner wall of said insert hole.

21. The mold according to claim 20, wherein said fixing means further comprises a fastening piece which extends from the open side of said insert hole into engagement with the wall face of said nest molds located on said open side and said actuator means presses said fastening piece toward the innermost section of said insert hole.

22. A mold comprising:
a stationary mold base;
a runner stripper plate, capable of moving a prescribed stroke distance from said stationary mold base;
an intermediate mold base, which is capable of moving a prescribed stroke distance from said runner stripper plate and having a nest-mold insert hole defining one side located in a direction perpendicular to a mold closing direction open and capable of receiving a plurality of nest molds;
a movable mold base, which is fixed on a movable board capable of moving toward said stationary mold base, facing said intermediate mold base, and defining a nest-mold insert hole having one side located in the direction perpendicular to the mold-closing direction open and capable of receiving a plurality of nest-molds;
nest molds, which, with contacted wall faces among adjacent members, may be inserted into said intermediate and movable mold bases, said nest molds are engaged with the inner wall of said insert hole and with the wall faces of adjacent nest molds to avoid slippage in the mold closing direction, said nest molds generally forming cavities for molding of the molded product upon mold closure;
fixing means including actuator means for pressing said nest molds placed on said open side of said insert hole in the direction from said open side of said insert hole toward the innermost side of said insert hole;
a hot runner block defining a resin passage therein and whose branched ends extend from said stationary mold base toward corresponding nest molds in said intermediate mold base;
a sprue bush covering said branched ends of said hot runner block, said sprue bush being fixed on said stationary mold base and having a front end section inserted into a through-hole provided on said runner stripper plate, said sprue bush having an undercut around the outer circumference of the front end section thereof which is projected over the surface of said runner stripper plate upon mold closure, and said sprue bush having a resin conduit at the front end thereof leading to the resin passage at said branched end of said hot runner block; and a recess defined by one of a back face of said nest mold and a substitute nest mold inserted in said intermediate mold base, said recess being sufficiently deep and wide be be able to cover the front end section of said sprue bush which is projected from said runner stripper plate at mold closing.

23. The mold according to claim 22, wherein on one wall face of said nest mold is a projection extending perpendicularly to the direction of mold closing, and on the wall face opposite to said wall face with said projection thereon is a groove in correspondence with said projection, and on one inner wall of said insert hole, said mold defining a groove in correspondence with said projection of said nest mold, and on the other inner wall of said insert hole is a projection capable of entering said groove of said nest mold, and said projections and grooves enable engagement of grooves and projections between said nest molds themselves and between nest molds and the inner wall of said insert hole.

24. The mold according to claim 22, wherein said fixing means further comprises a fastening piece which extends from the open side of said insert hole into contact with the wall faces of said nest molds located on said open side and said actuator means is positioned for urging said fastening piece toward the innermost section of said insert hole.

25. A mold comprises:
a stationary mold base;
a runner stripper plate, capable of moving a prescribed stroke distance from said stationary mold base;
an intermediate mold base, which is capable of moving a prescribed stroke distance from said runner stripper plate and possesses a nest mold insert having one side located in a direction perpendicular to a mold-closing direction open and capable of receiving a plurality of nest molds;
a movable mold base, which is fixed on a movable board capable of moving toward said stationary mold base, facing said intermediate mold base, and possesses a nest-mold insert hole having one side located in the direction perpendicular to the mold-closing direction open and capable of receiving a plurality of nest molds;
nest molds having contacting wall faces among adjacent members when said nest molds are inserted into said intermediate and movable mold bases, said nest molds being engaged with the inner side of said insert hole and with the wall faces of adjacent nest molds to avoid slippage in the mold closing direction, and said nest molds generally forming cavities for molding the molded product upon mold closure;
fixing means including actuator means for pressing said nest molds placed on said open side of at least said movable mold base in a direction from said open side of said base toward an innermost side of said insert hole;
a nozzle, whose branched ends project from said stationary mold base toward said nest molds of corresponding intermediate mold base and which injects resin to at least one nest mold through sprue holes provided on said runner stripper plate;
runner lock pins, which are provided vertically on said stationary mold base around said branched ends of said nozzle, said pins having front end sections with undercuts at the front ends thereof inserted into through-holes provided on said runner stripper plate, said pins being short enough for the front ends thereof to avoid projecting over the surface of said runner stripper plate at mold closing;
runner channels, which are provided on back faces of said nest molds and connect sprue holes provided on said runner stripper plate to suitably selected ones of said through-holes on said runner lock pins; and
runner holes, which connect said runner channels to the cavities for molded products.

26. The mold according to claim 25, wherein on one wall face of said nest mold is a projection extending perpendicularly to the direction of said mold closing, and on the wall face opposite to said wall face with said projection thereon is a groove in correspondence with said projection, and on one inner wall of said insert hole is a groove in correspondence with said projection of said nest mold, and on the other inner wall of said insert hole is a projection capable of entering said groove of said nest mold, and said projections and grooves enable engagement of grooves and projections between said nest molds themselves and between nest molds and the inner wall of said insert hole.

27. The mold according to claim 25, wherein said fixing means further comprises a fastening piece which extends from the open side of said insert hole into contact with the wall faces of said nest molds located on said open side and also comprises an actuator which urges said fastening piece toward the innermost section of said insert hole.

28. A mold comprising:
a plurality of nest molds;
a pair of mold bases, each of which has a nest-mold insert hole and having an opening in one side thereof, said opening being such as to permit said plurality of nest molds to be placed in said insert hole through said opening in a direction perpendicular to a mold closing direction;
said plurality of nest molds having adjacent wall faces in contact when placed into said insert hole from the opening and having at least some of said nest molds in engagement with an inner wall of said insert hole to thereby avoid slippage of said nest molds in the mold closing direction, said nest molds generally forming cavities for molding the molded products upon mold closure;
fixing means including actuator means for pressing said nest molds within said insert hole toward at least said inner wall thereof; and
means for providing a cooling fluid, said means for providing extending through said nest molds and said fixing means and being detachably interconnected when said nest molds are pressed within said insert hole by male-female couplers between nest molds adjacent said fixing means and said fixing means itself and between adjacent nest molds.

* * * * *